United States Patent
Choi et al.

(10) Patent No.: US 11,855,438 B2
(45) Date of Patent: Dec. 26, 2023

(54) MULTI-CIRCUIT DC BREAKING SYSTEM

(71) Applicant: GREEN ENERGY INSTITUTE, Jeollanam-do (KR)

(72) Inventors: Hyenjun Choi, Jeollanam-Do (KR); Jihoon Park, Busan (KR); Hyewon Choi, Gwangju (KR); Insung Jeong, Gwangju (KR)

(73) Assignee: GREEN ENERGY INSTITUTE, Jeollanam-do (KR)

( * ) Notice: Subject to any disclaimer, the term of this patent is extended or adjusted under 35 U.S.C. 154(b) by 322 days.

(21) Appl. No.: 17/395,063

(22) Filed: Aug. 5, 2021

(65) Prior Publication Data

US 2021/0376590 A1 Dec. 2, 2021

Related U.S. Application Data

(63) Continuation of application No. PCT/KR2020/012100, filed on Sep. 8, 2020.

(30) Foreign Application Priority Data

May 22, 2020 (KR) .................. 10-2020-0061541

(51) Int. Cl.
  *H02H 3/02* (2006.01)
  *H02H 3/087* (2006.01)
  *H02H 1/00* (2006.01)

(52) U.S. Cl.
  CPC .......... *H02H 3/025* (2013.01); *H02H 1/0015* (2013.01); *H02H 3/087* (2013.01)

(58) Field of Classification Search
  CPC ...... H02H 3/025; H02H 1/0015; H02H 3/087; H01H 33/125; H01H 33/167; H01H 33/596; H01H 33/6662
  See application file for complete search history.

(56) References Cited

U.S. PATENT DOCUMENTS

| | | | | |
|---|---|---|---|---|
| 10,116,132 | B2 * | 10/2018 | Lee | ........... H01H 33/596 |
| 2007/0139832 | A1 * | 6/2007 | Lee | ........... H02H 9/023 361/19 |

(Continued)

FOREIGN PATENT DOCUMENTS

| | | |
|---|---|---|
| KR | 101182968 B1 | 9/2012 |
| KR | 20150130181 A | 11/2015 |

(Continued)

OTHER PUBLICATIONS

Written Opinion issued by ISA/KR in connection with PCT/KR2020/012100 dated Feb. 18, 2021.

(Continued)

*Primary Examiner* — Jared Fureman
*Assistant Examiner* — Nicolas Bellido
(74) *Attorney, Agent, or Firm* — Levenfeld Pearlstein, LLC

(57) ABSTRACT

A multi-circuit DC breaking system is proposed. According to an exemplary embodiment of the present technique, there may be an advantage that by combining current-limiting technology and multi-circuit breaking technology, a failure may be quickly detected, a magnitude of a fault current may be firstly limited, and a breaking operation is performed, in a range of various fault currents, by distributing the fault currents to some circuits of multi-circuits configured in parallel, thereby easily increasing the capacity thereof.

5 Claims, 3 Drawing Sheets

(56) References Cited

U.S. PATENT DOCUMENTS

| | | | | |
|---|---|---|---|---|
| 2015/0236502 A1* | 8/2015 | Xu | ................... | H02H 3/025 |
| | | | | 361/93.9 |
| 2015/0332884 A1* | 11/2015 | Lee | ................ | H01H 71/2409 |
| | | | | 361/42 |
| 2015/0333506 A1* | 11/2015 | Bang | ................. | H02H 9/023 |
| | | | | 361/58 |

FOREIGN PATENT DOCUMENTS

| KR | 20150130182 A | 11/2015 |
|---|---|---|
| KR | 101658539 B1 | 9/2016 |
| KR | 20160140168 A | 12/2016 |
| KR | 20180059618 A | 6/2018 |
| KR | 20180099431 A | 9/2018 |

OTHER PUBLICATIONS

International Search Report issued by ISA/KR in connection with PCT/KR2020/012100 dated Feb. 18, 2021.

\* cited by examiner

MULTI-CIRCUIT DC BREAKING SYSTEM

TECHNICAL FIELD

The present invention relates to a multi-circuit DC breaking system and, more particularly, to a multi-circuit DC breaking system that breaks a fault current of a DC power grid and extinguishes an arc.

BACKGROUND ART

In 2017, the South Korean government announced the Renewable Energy 3020 Plan and has steadily increased the supply of renewable energy. In particular, in order to satisfy the supply of renewable energy with a power generation ratio of 35% specified in the Renewable Energy 3020 Policy and the 3rd Energy Basic Plan, it is urgently required to develop the wind power industry having a potential of generating more than 12 GW of power. In the case of the wind power industry, wind power generators are increasingly installed in remote sea areas in order to increase the power generation efficiency and lower the unit cost, but with an existing High Voltage Alternative Current (HVAC) method, there are difficulties in power generation because efficiency drops sharply, power system collapses due to system frequency drop, etc. In order to solve these problems, a high voltage direct current (HVDC) method has been proposed, and active research has been conducted around the world, including in the United States, Europe, and China.

In order to apply and construct an HVDC system, it is essential to secure a DC breaking technology that extinguishes an arc stably within a short time. In direct current, unlike alternating current, an arc is generated due to surge voltage that occurs, due to the absence of a current zero point where energy is minimized, when an electric contact point is opened. In direct current, when an arc occurs, time for extinguishing the arc is very long, and at this time, high heat is generated locally, and due to the high heat, there is a risk of fire as well as damage to the contact terminals. Even during conduction, a magnitude of instantaneous inrush current is very large compared to that of AC.

DC circuit breakers previously developed may be broadly classified into semiconductor circuit breakers and mechanical circuit breakers. In a case of semiconductor breaking, fault current limiting is very fast and stable, but economic burden is very large and there is a problem with a heat generation phenomenon. Since mechanical circuit breakers are made of mechanical contact points, deterioration occurs due to arcing, and thus there is a disadvantage that the mechanical circuit breakers are only usable in very low ranges of voltage and current. Accordingly, there is an urgent need to develop a DC circuit breaker that is economical, stable, and capable of performing a breaking operation in various fault current ranges. In addition, in South Korea, since construction of an HVDC system applied with a superconducting cable capable of transmitting at least 5 times more power than the existing cable is being considered, the capacity should be increased compared to the previously proposed circuit breakers.

RELATED ART DOCUMENT (Patent Document 1) Korean Patent No. 10-1658539

DISCLOSURE

Technical Problem

The present invention is to solve the above-described problems, and an objective of the present invention is to provide a multi-circuit DC breaking system in which by combining current-limiting technology and multi-circuit breaking technology, a failure of a DC power grid may be quickly detected, a breaking operation may be performed in various fault current ranges, and capacity may be easily increased.

Technical Solution

The present invention for achieving the above objective provides a multi-circuit DC breaking system in a DC breaking system of a DC power grid, the multi-circuit DC breaking system including: a superconducting current-limiting module configured to detect a failure of the DC power grid through a phase transition and limit a maximum magnitude of a fault current; a hybrid controller configured to detect the fault current of the DC power grid according to a fault detection of the superconducting current-limiting module and transmit a circuit control signal according to the detected magnitude of the fault current; and a multi-circuit breaking module provided with a plurality of auxiliary circuits having different capacity in parallel connection, configured to break a main circuit of the DC power grid according to the circuit control signal received from the hybrid controller, and configured to extinguish an arc by connecting a part of the auxiliary circuits to the DC power grid.

Preferably, the superconducting current-limiting module may include a cooling device, a temperature sensor, and a controller, so as to maintain a critical condition and limit the maximum magnitude of the fault current according to an occurrence of impedance when the failure exceeding a critical value occurs.

Preferably, the hybrid controller may detect changes of magnitudes in current, resistance, and voltage of the DC power grid through the superconducting current-limiting module and select a protection circuit to be operated from among the plurality of auxiliary circuits by analyzing the magnitude of the fault current by using a shunt resistor and a probe controller.

Preferably, in a contact point of the multi-circuit breaking module, a vacuum interrupter may be used to extinguish the arc generated during an opening/closing operation by vacuum.

Preferably, the multi-circuit breaking module may include a permanent magnet actuator configured to operate each auxiliary circuit, and each auxiliary circuit opened through the circuit control signal may perform a breaking operation by excitation of a coil of the permanent magnet actuator.

Advantageous Effects

According to the present invention as described above, there is an advantage that by combining the current-limiting technology and the multi-circuit breaking technology, a failure may be quickly detected, a magnitude of fault current may be firstly limited, and in a range of various fault currents, a breaking operation is performed by distributing the fault currents to some circuits of multi-circuits configured in parallel, thereby easily increasing the capacity.

BEST MODE

The above objectives, other objectives, features and advantages of the present invention will be readily understood through the following preferred exemplary embodiments in conjunction with the accompanying drawings. However, the present invention is not limited to the exemplary embodiments described herein and may be embodied in other forms. Rather, the exemplary embodiments introduced herein are provided so that the disclosed subject matter may be thorough and complete, and that the spirit of the present invention may be sufficiently conveyed to those skilled in the art. In the present specification, when a first component is referred to as being "on" a second component, it means that the first component may be directly formed on the second component or a third component may be interposed therebetween.

The terminology used herein is for the purpose of describing particular exemplary embodiments only and is not intended to be limiting of the present invention. In this specification, the singular form also includes the plural form unless otherwise specified in the phrase. As used herein, "comprises" and/or "comprising" does not exclude the presence or addition of one or more other components in addition to the mentioned components.

Hereinafter, the present invention will be described in detail with reference to the drawings. In describing the specific exemplary embodiments below, various characteristic contents have been prepared to more specifically explain the invention and help understanding. However, a reader having enough knowledge in this field to understand the present invention may recognize that the present invention is applicable without these various specific details. In some cases, it is mentioned in advance that in describing the present invention, parts that are commonly known and not largely related to the present invention are not described in order to avoid confusion without any reason in explaining the present invention.

Figure 1:
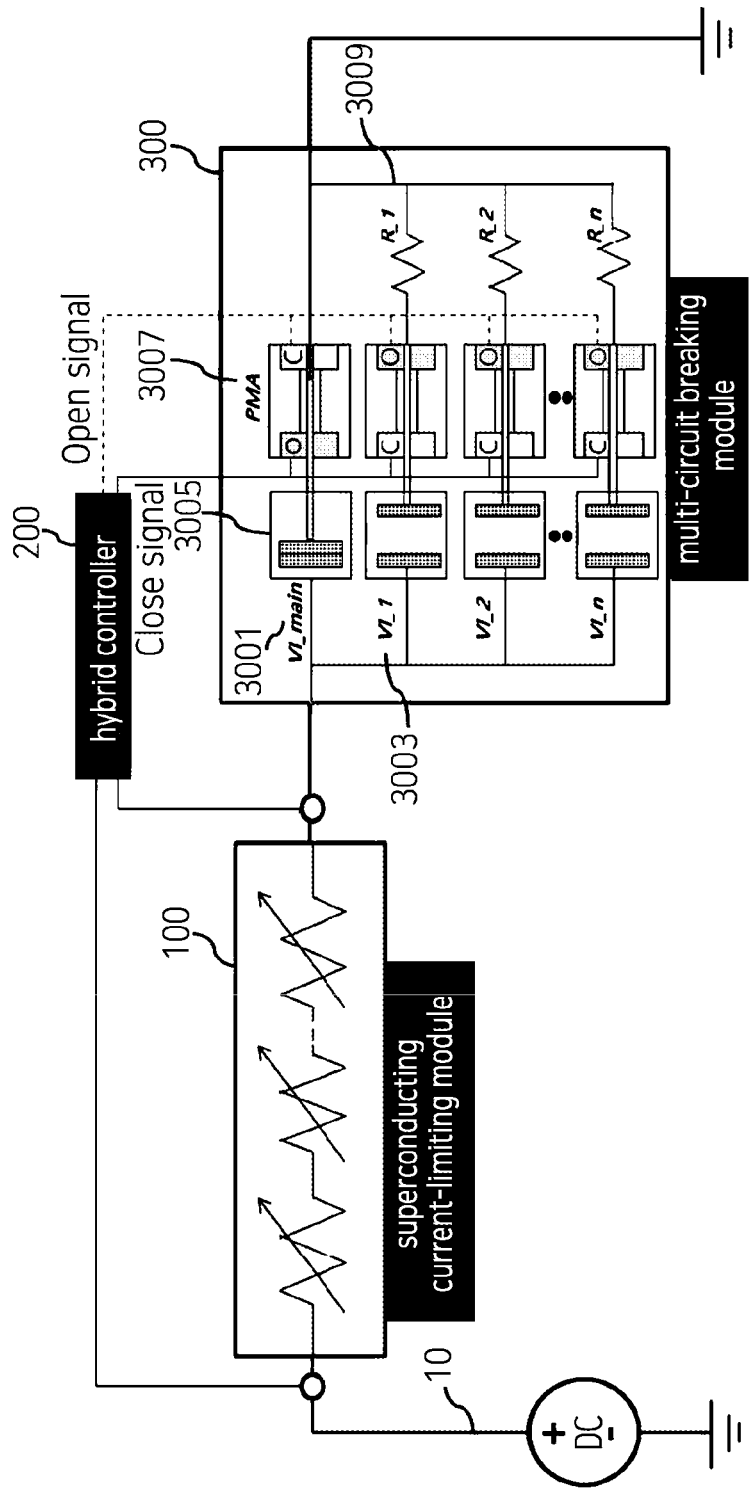
FIG. 1 is a circuit diagram showing a multi-circuit DC breaking system according to the present invention.

FIG. 1 is a circuit diagram showing a multi-circuit DC breaking system according to the present invention. Referring to FIG. 1, the multi-circuit DC power breaking system according to the present invention includes a superconducting current-limiting module 100, a hybrid controller 200, and a multi-circuit breaking module 300.

Figure 2:
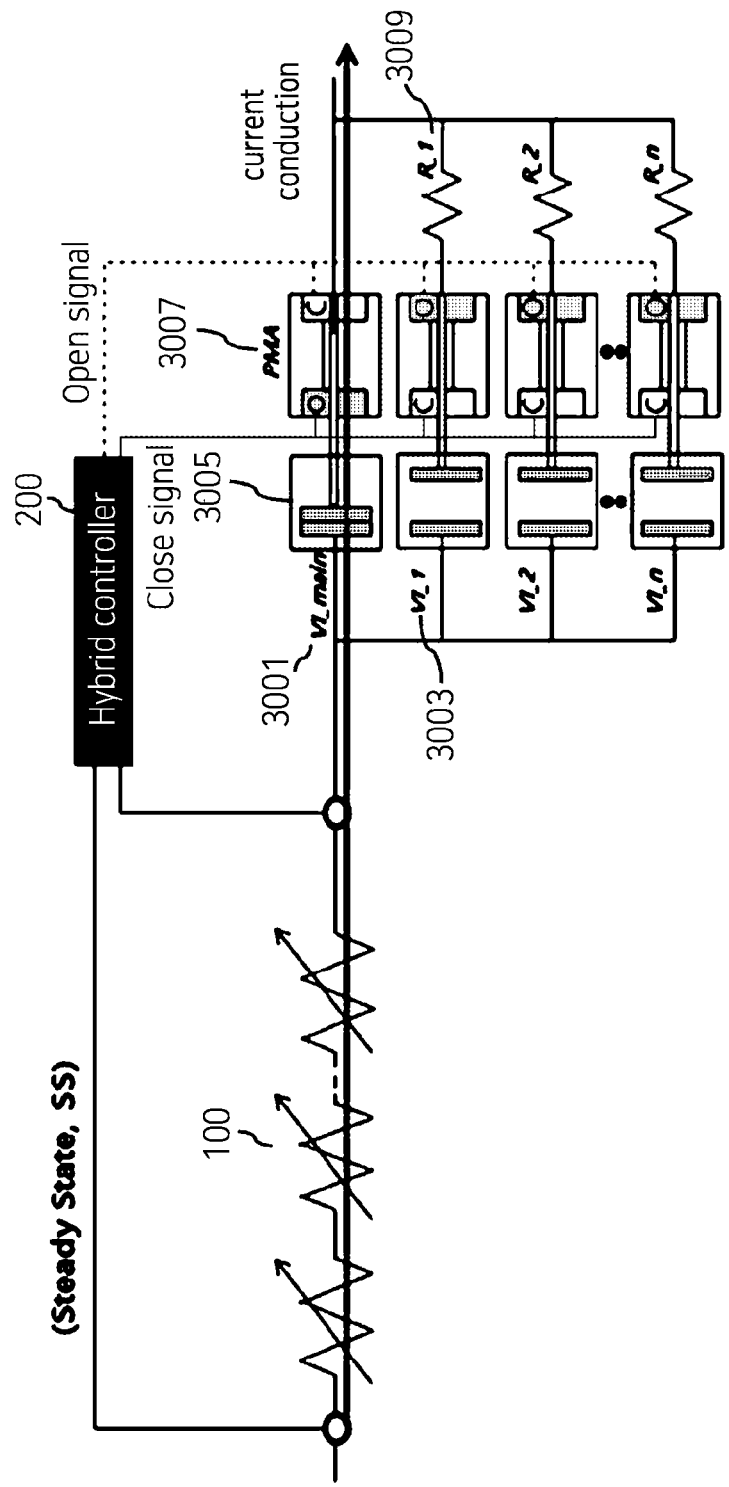
FIG. 2 is a view showing an example of a steady state circuit diagram and current conduction of the multi-circuit DC breaking system according to the present invention.

FIG. 2 is a view showing an example of a steady state circuit diagram and current conduction of the multi-circuit DC breaking system according to the present invention.

Figure 3:
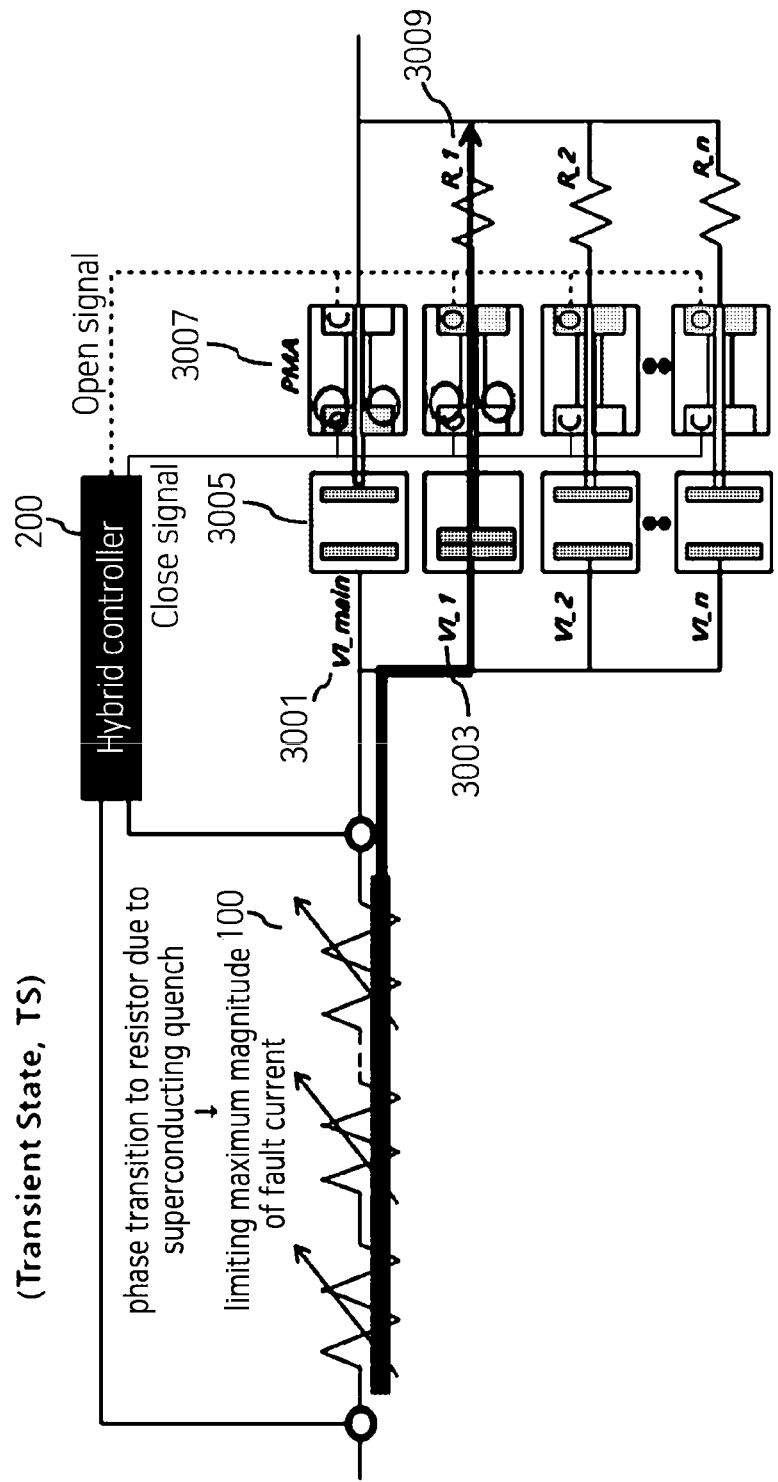
FIG. 3 is a view showing an example of a transient state circuit diagram and current conduction of the multi-circuit DC breaking system according to the present invention.

FIG. 3 is a view showing an example of a transient state circuit diagram and current conduction of the multi-circuit DC breaking system according to the present invention.

The superconducting current-limiting module 100 detects a failure of a DC power grid 10 through a phase transition and limits a maximum magnitude of fault current. In addition, the superconducting current-limiting module 100 includes a cooling device, a temperature sensor, and a controller, so as to maintain a critical condition and limit the maximum magnitude of fault current depending on an occurrence of impedance when a failure occurs that exceeds a critical value.

Since the superconducting current-limiting module 100 uses a superconductor to maintain superconductivity with a resistance of 0 below a critical condition, no power loss occurs. In addition, in the superconducting current-limiting module 100 in a steady state, current is stably conducted through a main circuit 3001, and an electric contact point of an auxiliary circuit 3003 except for the main circuit 3001 remains open.

The superconducting current-limiting module 100 may detect a failure within a few ms in a transient state and may be transferred to a phase conductor having an arbitrary high impedance to primarily limit the maximum magnitude of the fault current. In addition, information regarding voltage, resistance, and current that conducts at a moment when the superconducting current-limiting module 100 is in phase may be transmitted to the hybrid controller 200.

The hybrid controller 200 detects a fault current of a DC power grid 10 according to fault detection of the superconducting current-limiting module and transmits a circuit control signal according to the magnitude of the detected fault current. The hybrid controller 200 transmits a failure signal of the superconducting current-limiting module 100 to the multi-circuit breaking module 300 so as to operate a permanent magnet actuator, thereby enabling a line to be broken within a short time.

In addition, the hybrid controller 200 may detect changes in magnitudes of current, resistance, and voltage of the DC power grid 10 through the superconducting current-limiting module 100, and may select a protection circuit 3003 to be operated from among a plurality of auxiliary circuits 3003 by analyzing the magnitude of a fault current by using a shunt resistor and a probe controller.

The hybrid controller 200 may instruct the auxiliary circuit 3003 to perform a breaking operation by analyzing the magnitude of the fault current on the basis of the information received from the superconducting current-limiting module 100 and selecting the auxiliary circuit 3003 to be operated in the multi-circuit breaking module 300.

The multi-circuit breaking module 300 is provided with a plurality of auxiliary circuits 3003, having different capacities, in parallel connection, breaks the main circuit 3001 of the DC power grid 10 according to a circuit control signal received from the hybrid controller 200, and connects a part of the auxiliary circuit 3003 to the DC power grid 10 to extinguish an arc.

In addition, in a contact point of the multi-circuit breaking module 300, a vacuum interrupter 3005 is used to extinguish the arc, which is generated during an opening/closing operation, by vacuum.

In addition, the multi-circuit breaking module 300 includes a permanent magnet actuator 3007 configured to operate an auxiliary circuit 3003, and the auxiliary circuit 3003 that is opened through the circuit control signal may perform a breaking operation by excitation of a coil of the permanent magnet actuator 3007.

By receiving an instruction from the hybrid controller 200, the multi-circuit breaking module 300 energizes the C/O coil of the permanent magnet actuator 3007 which is an actuator of the auxiliary circuit 3003 in the multi-circuit breaking module 300, separates the main circuit 3001, and bypasses the fault current to the auxiliary circuit 3003, so that the breaking operation may be performed.

The multi-circuit breaking module 300 may protect the main circuit 3001 by energizing the C/O coil of the permanent magnet actuator, turning on or off a contact point of the vacuum interrupter 3005, and bypassing the fault current from the main circuit 3001 to the auxiliary circuit 3003. The bypassed fault current is distributed to each circuit according to the magnitude thereof, so that the breaking operation is performed, thereby completely breaking the fault current from the power grid.

In the multi-circuit breaking module 300, the fault current is distributed to an associated auxiliary circuit 3003 according to the magnitude of the fault current, so as to be broken, and a final residual value is extinguished by an associated resistor 3009, so that the breaking operation may be completed. According to the distribution of the fault current, power burden is alleviated, and the magnitude of an arc generated when the contact point of the vacuum interrupter 3005 is opened may be reduced.

Therefore, the maximum magnitude of the fault current is primarily limited by the superconducting current-limiting module 100, and the fault current is dispersed and extinguished according to the magnitude thereof by the hybrid controller 200 and the multi-circuit breaking module 300, whereby arc energy is very small, so a stable breaking operation is possible within a short time.

According to the present invention, the current-limiting technology and the multi-circuit breaking technology are combined so that the superconducting current-limiting module 100 detects a failure within a few ms, first limits the maximum magnitude of the fault current, and disperses the power applied to the breaker, thereby reducing a possibility of a breaking failure. The hybrid controller 200 receives a failure detection parameter, analyzes the magnitude, selects an operation circuit from among the auxiliary circuits 3003 in the multi-circuit breaking module 300, and instructs the operation. As the hybrid controller 200 is able to open and close the auxiliary circuit 3003 for each capacity in the multi-circuit breaking module 300, an application system is flexible, so that replacement cycle and economic cost may be reduced.

The multi-circuit breaking module 300 breaks the main circuit 3001 by receiving an opening/closing instruction from the hybrid controller 200, and connects to the auxiliary circuit 3003 to extinguish an arc, thereby breaking the fault current. The multi-circuit breaking module may have high stability and high operation speed by using the vacuum interrupter 3005 and the permanent magnet actuator 3007.

The multi-circuit breaking module 300 may facilitate the increase of capacity with a simple structure by designing and manufacturing a plurality of auxiliary circuits 3003 according to the capacity thereof and configuring the auxiliary circuits 3003 in parallel.

In the multi-circuit DC breaking system according to the present invention, the structure thereof is simple and the capacity thereof is easy to be increased, so that the range of application systems is flexible. By combining the current-limiting technology and the breaking technology to distribute the power and perform the breaking operation, the magnitude of an arc is reduced and the breaking speed and time are reduced, so that the possibility of breaking failure is reduced, thereby greatly improving the reliability and stability of the system.

The present invention is a DC circuit breaker that is applicable to DC power transmission and is applicable to various DC power-based fields such as offshore wind power generation, renewable energy sources, distributed power, and smart grid, and thus as the related markets develop, the applicability thereof is expected to be high.

The above description of the present invention is for illustration, and it will be understood that those skilled in the art to which the present disclosure pertains may easily transform the present disclosure in other specific forms without departing from the technical spirit or essential features thereof. Therefore, the exemplary embodiments described above are to be understood in all respects as illustrative and not restrictive. For example, each component described as a single type may be implemented in a distributed manner, and similarly, components described as distributed may be implemented in a combined form.

The scope of the present invention is indicated by the following claims rather than the above detailed description, and all changes or modifications derived from the meaning and scope of the claims and equivalent concepts should be interpreted as being included in the claims of the present invention.

DESCRIPTION OF THE REFERENCE NUMERALS IN THE DRAWINGS

10 DC power grid
100 superconducting current-limiting module
200 hybrid breaker
300 multi-circuit breaking module
3001 main circuit
3003 auxiliary circuit
3005 vacuum interrupter
3007 permanent magnet actuator
3009 resistor This research was supported by the Ministry of Trade, Industry and Energy (MOTIE), Korea, under the Energy Technology Development Project support program (Project Number: 20203010020020) supervised by the Korea Institute of Energy Technology Evaluation and Planning (KETEP).

The invention claimed is:

1. A multi-circuit DC breaking system in a DC breaking system of a DC power grid, the multi-circuit DC breaking system comprising:
   a superconducting current-limiting module configured to detect a failure of the DC power grid through a phase transition and limit a maximum magnitude of a fault current;
   a hybrid controller configured to detect the fault current of the DC power grid according to a fault detection of the superconducting current-limiting module and transmit a circuit control signal according to the detected magnitude of the fault current; and
   a multi-circuit breaking module provided with a plurality of auxiliary circuits having different capacity in parallel connection, configured to break a main circuit of the DC power grid according to the circuit control signal received from the hybrid controller, and configured to extinguish an arc by connecting a part of the auxiliary circuits to the DC power grid.

2. The multi-circuit DC breaking system of claim 1, wherein the superconducting current-limiting module comprises a cooling device, a temperature sensor, and a controller, so as to maintain a critical condition and limit the maximum magnitude of the fault current according to an occurrence of impedance when the failure exceeding a critical value occurs.

3. The multi-circuit DC breaking system of claim 1, wherein the hybrid controller detects changes of magnitudes in current, resistance, and voltage of the DC power grid through the superconducting current-limiting module and selects a protection circuit to be operated from among the plurality of auxiliary circuits by analyzing the magnitude of the fault current by using a shunt resistor and a probe controller.

4. The multi-circuit DC breaking system of claim 1, wherein, in a contact point of the multi-circuit breaking module, a vacuum interrupter is used to extinguish the arc generated during an opening/closing operation by vacuum.

5. The multi-circuit DC breaking system of claim 3, wherein the multi-circuit breaking module comprises a permanent magnet actuator configured to operate each auxiliary circuit, and each auxiliary circuit opened through the circuit control signal performs a breaking operation by excitation of a coil of the permanent magnet actuator.

* * * * *